United States Patent [19]

Hardin

[11] 4,352,532
[45] Oct. 5, 1982

[54] MANIFOLDING MEANS FOR ELECTRICAL AND/OR PNEUMATIC CONTROL UNITS AND PARTS AND METHODS THEREFOR

[75] Inventor: George T. Hardin, Knoxville, Tenn.

[73] Assignee: Robertshaw Controls Company, Richmond, Va.

[21] Appl. No.: 187,497

[22] Filed: Sep. 15, 1980

[51] Int. Cl.$^3$ .............................................. H01R 04/64
[52] U.S. Cl. .................................... 339/15; 137/269; 137/884
[58] Field of Search .................... 339/15, 16; 137/269, 137/884, 885

[56] References Cited

U.S. PATENT DOCUMENTS

| | | | |
|---|---|---|---|
| 4,093,329 | 6/1978 | Asbill | 339/16 R |
| 4,095,863 | 6/1978 | Hardin | 339/15 |
| 4,095,864 | 6/1978 | Hardin | 339/15 |
| 4,130,137 | 12/1978 | Lane | 137/884 |
| 4,165,139 | 8/1979 | Asbill | 339/15 |

Primary Examiner—Joseph H. McGlynn
Assistant Examiner—Frank H. McKenzie, Jr.
Attorney, Agent, or Firm—Candor, Candor & Tassone

[57] ABSTRACT

A manifold means adapted to detachably carry on one side thereof a plurality of pneumatically and electrically operated control units each of which is adapted to be fluidly and electrically interconnected to pneumatic means and electrical means of the manifold means by plug-in means of the units respectively cooperating with plug-in means of the pneumatic means and electrical means of the manifold means at the one side thereof. The manifold means has external interconnection means for the pneumatic means and the electrical means on the other side thereof whereby external pneumatic and electrical lines can all be interconnected to that other side of the manifold means.

46 Claims, 8 Drawing Figures

MANIFOLDING MEANS FOR ELECTRICAL AND/OR PNEUMATIC CONTROL UNITS AND PARTS AND METHODS THEREFOR

BACKGROUND OF THE INVENTION

1. Field of the Invention

This invention relates to an improved manifold means for pneumatically and electrically operated control units and to a method of making such a manifold means. In addition, this invention relates to improved frame means for making such a manifold means and a method of making such a frame means.

2. Prior Art Statement

It is known to provide a manifold means to detachably carry on one side thereof a plurality of pneumatically and electrically operated control units, the one side of the manifold means having external interconnection means for interconnecting to external pneumatic and electrical lines whereby the external pneumatic and electrical lines can be interconnected to the same side of the manifold means that the units are interconnected thereto.

Such pneumatically and electrically operated control units are adapted to have plug-in means thereof respectively cooperating with plug-in means of the pneumatic means and the electrical means of the manifold means at the one side of the manifold means.

For example, see the following four United States Patents:

(1) U.S. Patent to Asbill, III, U.S. Pat. No. 4,093,329
(2) U.S. Patent to Hardin, U.S. Pat. No. 4,095,863
(3) U.S. Patent to Hardin, U.S. Pat. No. 4,095,864
(4) U.S. Patent to Asbill, III, U.S. Pat. No. 4,165,139

It appears that the manifold means in each of the above items (1)-(4) has the interconnection means for interconnecting to the external pneumatic and electrical lines disposed on the same side of the manifold means that the control units are detachably interconnected thereto.

Other prior known manifold means have the external pneumatic lines interconnected to one side thereof and the external electrical lines interconnected to another side thereof.

SUMMARY OF THE INVENTION

It is a feature of this invention to provide an improved manifold means that permits the pneumatically and electrically operated control units to be readily attached and detached to and from one side thereof and have all of the external electrical and pneumatic lines interconnected to the manifold means at the other side thereof.

In particular, one embodiment of this invention provides a manifold means adapted to detachably carry on one side thereof a plurality of pneumatically and electrically operated control units each of which is adapted to be fluidly and electrically interconnected to pneumatic means and electrical means of the manifold means by plug-in means of the units respectively cooperating with plug-in means of the pneumatic means and electrical means of the manifold means at the one side thereof. The manifold means has external interconnection means for the pneumatic means and electrical means on the other side thereof whereby the external pneumatic and electrical lines can be interconnected to the other side of the manifold means.

The manifold means can include a frame means that detachably carries the electrical means and pneumatic means in a unique manner as hereinafter set forth.

Accordingly, it is an object of this invention to provide an improved manifold means having one or more of the novel features of this invention as set forth above or hereinafter shown or described.

Another object of this invention is to provide an improved method of making such a manifold means, the method of this invention having one or more of the novel features of this invention as set forth above or hereinafter shown or described.

Another object of this invention is to provide an improved frame means for making such a manifold means, the frame means of this invention having one or more of the novel features of this invention as set forth above or hereinafter shown or described.

Another object of this invention is to provide a method of making such a frame means, the method of this invention having one or more of the novel features of this invention as set forth above or hereinafter shown or described.

Other objects, uses, and advantages of this invention are apparent from a reading of this description which proceeds with reference to the accompanying drawings forming a part thereof and wherein:

DESCRIPTION OF THE PREFERRED EMBODIMENTS

Figure 1:
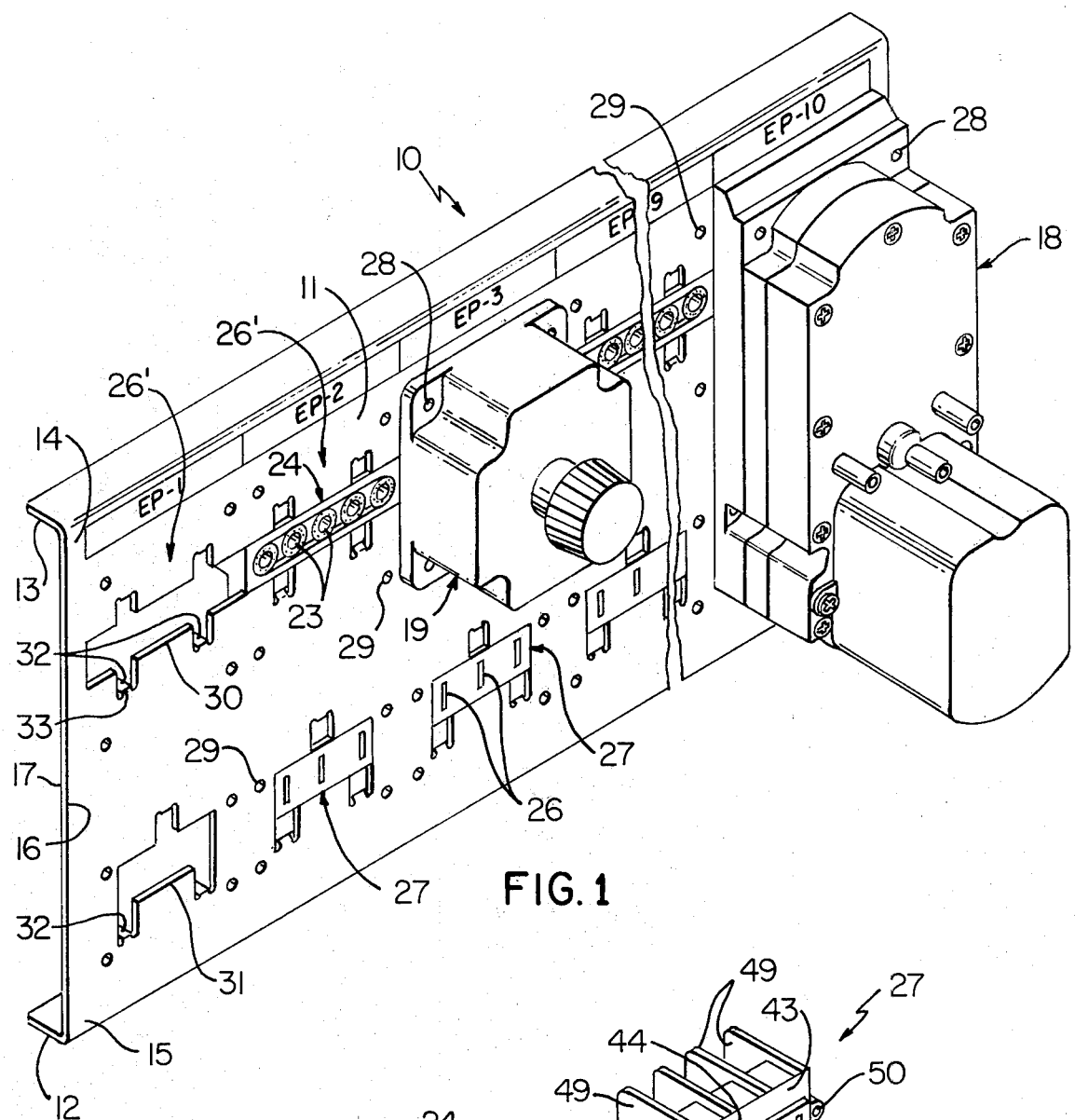
FIG. 1 is a perspective view illustrating the improved manifold means of this invention carrying a plurality of control units.

While the various features of this invention are hereinafter described and illustrated as being particularly adapted to provide a manifold means for pneumatically and electrically operated control units, it is to be understood that the various features of this invention could be utilized singly or in any combination thereof to provide manifold means for other types of control units as desired, such as control units that are only pneumatically operated or just electrically operated or a combination thereof.

Therefore, this invention is not to be limited to only the embodiments illustrated in the drawings, because the drawings are merely utilized to illustrate one of the wide varieties of uses of this invention.

Referring now to FIG. 1, the improved manifold means of this invention is generally indicated by the reference numeral 10 and comprises a frame means or plate 11 formed of any suitable material, such as metallic material, and having turned edges 12 and 13 at the opposed ends 14 and 15 thereof to rigidify the frame means 11 as well as provide mounting means therefor in a control cabinet or the like as desired.

The frame means 11 has opposed flat sides 16 and 17 which respectively define the opposed sides of the manifold means 10, the side 16 of the manifold means 10 being adapted to carry a plurality of control units 18 and 19 in a manner hereinafter set forth.

Each control unit 18 is a pneumatically and electrically operated control unit whereas each control unit 19 is a pneumatically operated control unit. However, it is to be understood that just electrically operated control units can also be carried on the side 16 of the manifold means 10 of this invention as will be apparent hereinafter.

Figure 5:
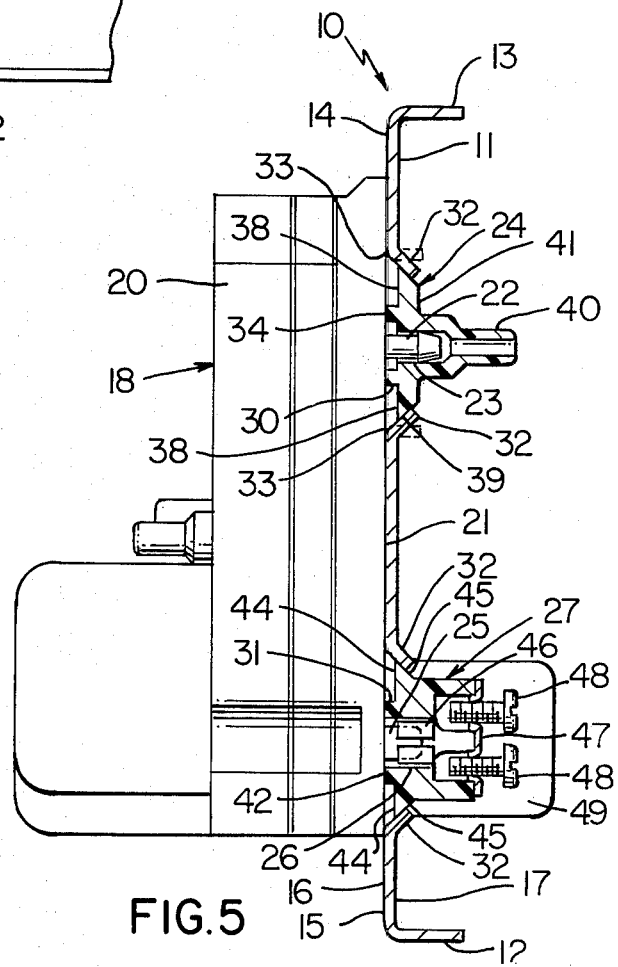
FIG. 5 is a cross-sectional view taken on line 5—5 of FIG. 4.

As illustrated in FIG. 5, each control unit 18 has a housing means 20 that is provided with a substantially flat side 21 from which a plurality of plug-in means 22 for the pneumatically operated means of the control unit 18 project, the plug-in means 22 comprising a plurality of nipple-like members disposed in spaced apart aligned relation and adapted to respectively plug in to a cooperating number of plug-in openings 23 of a pneumatic means 24 of the manifold means 10 formed in a manner hereinafter set forth.

Similarly, each control unit 18 has a plurality of electrical plug-in tongues 25 for the electrically operated means thereof projecting in aligned spaced relation from the side 21 thereof to be respectively received in a cooperating number of plug-in sockets 26 of electrical means 27 of the manifold means 10 formed in the manner hereinafter set forth.

The particular details of the control devices 18 need not be further described as the structural details of the control devices 18 do not form part of this invention. However, see the aforementioned four U.S. Patents for further details of the control devices 18 as such four U.S. Patents are being incorporated herein by reference thereto.

While the side 16 of the manifold means 10 can be arranged in any desired fashion, the embodiment of the frame means 11 illustrated in the drawings has the surface 16 thereof divided into a plurality of vertical sections 26' each of which is adapted to have a pneumatic means 24 thereof disposed adjacent the end 14 of the frame means 11 and an electrical means 27 thereof adjacent the end 15 thereof so that one control unit 18 for the respective section 26' can have the pneumatic plug-in means 22 and plug-in electrical means 25 thereof respectively cooperating with the pneumatic means 24 and electrical means 27 of that particular section 26' in the manner illustrated in FIG. 1.

Similarly, since the control unit 19 is only a pneumatically operated control unit, the same can have its plug-in pneumatic means 22 (not shown) plugged into the pneumatic means 24 of its particular section 26' of the frame means 11 receiving the same.

Obviously, a control unit (not shown) that is only electrically operated could have the electrical plug-in tongues 25 thereof interconnected to the electrical means 27 of the desired section 26' of the manifold means 10 in a similar manner.

Thus, it can readily be seen that the manifold means 10 permits a plurality of control units 18 and 19 (or other control units not shown) to be detachably carried on the side 16 thereof by having the plug-in means 22 and 25 of the control units 18 and 19 plugged into the plug-in means 23 and 26 of the manifold means 10 and should it be desired to further fasten the control units 18 and 19 thereto, the control units 18 and 19 can have fastening means disposed through suitable mounting opening 28 thereof to be fastened into suitable mounting openings 29 formed through the frame means 11 as illustrated.

Nevertheless, it can be seen that each of the control units 18 and 19 for the manifold means 10 of this invention are detachably fastened to the same side 16 of the manifold means 10 as the other control units 18 and 19 thereof for all of the advantages set forth in the aforementioned four U.S. Patents.

The frame means 11 has a plurality of substantially rectangular opening means 30 passing therethrough with the opening means 30 being disposed in aligned relation adjacent the end 14 of the frame means 11 and actually intersecting with each other in the manner illustrated in the drawings.

A plurality of substantially rectangular opening means 31 are also formed through the frame means 11 in spaced apart and aligned relation adjacent the end 15 of the frame means 11.

The opening means 30 are each adapted to receive a pneumatic means 24 and each opening means 31 is adapted to receive an electrical means 27 in a manner hereinafter set forth whereby it can be seen that each vertical section 26' of the manifold means 10 has an opening 30 and an opening 31 therein.

When forming the opening means 30 and 31 in the frame means 11 by the method of this invention, such as by a stamping operation, a plurality of holding tabs 32 are carved from the frame means 11 adjacent the particular opening means 30 or 31 so as to be integrally hinged to the frame means 11 by hinge means 33 of the tab means 32.

The tab means 32 are adapted to provide holding means for holding the pneumatic means 24 and electrical means 27 to the frame means 11 in a manner hereinafter set forth, four such tab means 32 being provided for each opening 30 for the pneumatic means 24 and three such tab means 32 being provided for the opening means 31 for each electrical means 27.

When forming the tabs 32 by the method of this invention, such tabs 32 are normally formed substantially at right angles to the side 17 of the frame means 11 to facilitate assembly of the pneumatic means and electrical means 27 to the frame means 11 as will be apparent hereinafter.

Figure 2:
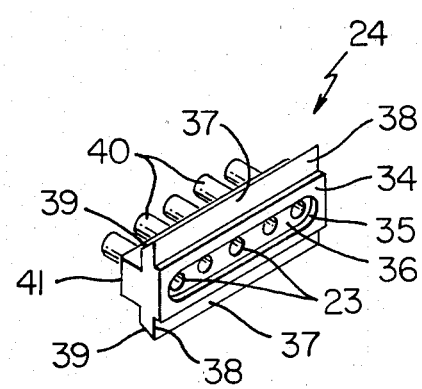
FIG. 2 is a perspective view of one of the pneumatic means of the manifold means of FIG. 1.

As illustrated in FIG. 2, each pneumatic means 24 comprises a block of suitable material, such as plastic material, molded into the configuration illustrated in FIG. 2 wherein the same has a substantially flat rectangular front face 34 interrupted by an elongated recess 35 that defines a recessed flat surface 36 which, in turn, is interrupted by a plurality of the plug-in openings or passages 23 as illustrated.

A pair of opposed flat flanges 37 extend from the pneumatic means 24 in offset relation to the front face 34 so that the flanges 37 can have the flat sides 38 thereof abut against the rear side 17 of the frame means 11 when the rectangular front face 34 thereof is pushed through a respective opening 30 so as to be disposed substantially flush with the front side 16 of the frame means 11 when the sides 38 of the flanges 37 abut against the side 17 of the frame means 11 as illustrated.

In this manner, the front face 16 of the frame means 11 does not have any projections thereon.

Once a particular pneumatic means 24 has been so inserted into its respective opening 30 of the frame means 11, the tab means 32 of that particular opening 30 are folded down against the beveled ends 39 of the flanges 37 of the particular pneumatic means 24 in the manner illustrated by full lines in FIG. 5 to detachably hold that particular pneumatic means 24 in place on the manifold means 10.

Each pneumatic means 24 has a plurality of nipple means 40 extending from the end 41 thereof with each nipple means 40 being associated with an opening means or passage 23 so that external flexible conduits, lines and the like can be interconnected to the nipple means 40 in a manner that is well known in the art.

Figure 6:
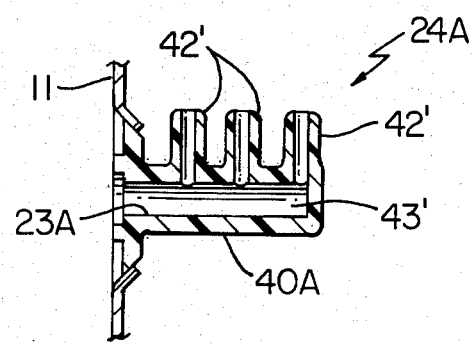
FIG. 6 is a fragmentary cross-sectional view of another embodiment of the pneumatic means of this invention.

If desired, each pneumatic means 24 could have the nipple means 40 that extends therefrom provide a plurality of interconnections for external lines in the manner illustrated in FIG. 6.

In particular, the pneumatic means 24A illustrated in FIG. 6 has the conduit means 40A extending therefrom but each nipple means 40A is interconnected to a plurality of aligned nipples 42' which intersect with a passage 43' of the nipple 40A substantially at right angles relative thereto so that a plurality of external conduits can be interconnected to the same plug-in means 23A of the pneumatic means 24A.

Figure 3:
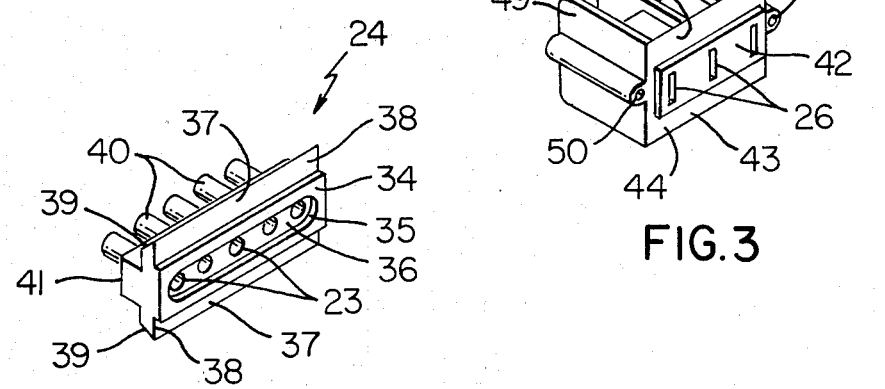
FIG. 3 is a perspective view of one of the electrical means of the manifold means of FIG. 1.

Each electrical means 27 as illustrated in FIG. 3 comprises a suitable block of material, such as plastic material, molded into the configuration illustrated wherein the same has a substantially rectangular front face 42 interrupted by the socket means 26 and being offset forwardly from a pair of opposed flanges 43 which respectively have flat sides 44 for abutting against the side 17 of the frame means 11 when the electrical means 27 is inserted in its respective opening 31 in the manner illustrated in FIG. 5, the front face 42 of the electrical means 27 being thus disposed flush with the side 16 of the frame means 11 in the same manner as the pneumatic means 24 previously described.

Once an electrical means 27 has been inserted into its respective opening means 31, the tab means 32 for that particular opening means 31 are bent against the beveled edges 45 of the flanges 43 in the manner illustrated in FIG. 5 to detachably hold the electrical means 27 to the frame means 11.

Each electrical means 27 has a female conductive socket member 46 disposed in its respective socket 26 and is electrically interconnected to a terminal strip 47 that is adapted to be electrically interconnected to external electrical lines by threaded fastening members 48 in a manner well known in the art, each terminal strip 47 being electrically insulated from an adjacent terminal strip 47 by flange means 49 of the block of material forming the respective electrical means 27.

Should it be desired to more permanently fasten the electrical means 27 to the frame means 11 rather than just rely on the holding tabs 32, suitable mounting openings 50 can be provided in the electrical means 27 for facilitating fastening the electrical means 27 to the frame means 11 with threaded fastening members or the like.

In any event, it can be seen that when making up a particular manifold means 10 of this invention, the desired number of pneumatic means 24 and electrical means 27 can be secured thereto without necessarily filling every opening 30 and 31 if it is known as to which type and number of control units are to be subsequently interconnected thereto so that only the pneumatic means 24 and electrical means 27 that will be utilized may be disposed in place on the manifold means 11 in the manner previously described.

Once the desired number of electrical means 27 and pneumatic means 24 have been secured to the side 17 of the manifold means 11 by the holding tabs 32 in the manner previously described, the control units 18 and 19 can be put into the side 16 thereof by having the pneumatic means 22 thereof plugged into the openings 23 of the respective pneumatic means 24 and have the electrical means 25 thereof plugged into the electrical sockets 26 of the electrical means 27 so as to be interconnected thereto.

Subsequently or before the control units 18 and 19 are plugged on to the side 16 of the manifold means 10, external pneumatic and electrical lines (not shown) can be respectively attached to the pneumatic means 24 and electrical means 27 at the nipple means 40 and terminal means 47 thereof in a manner well known in the art so that all of the external pneumatic and electrical lines will be interconnected to the manifold means 10 on the side 17 thereof while all of the control units 18 and 19 are detachably interconnected to the side 16 of the manifold means 10.

Figure 4:
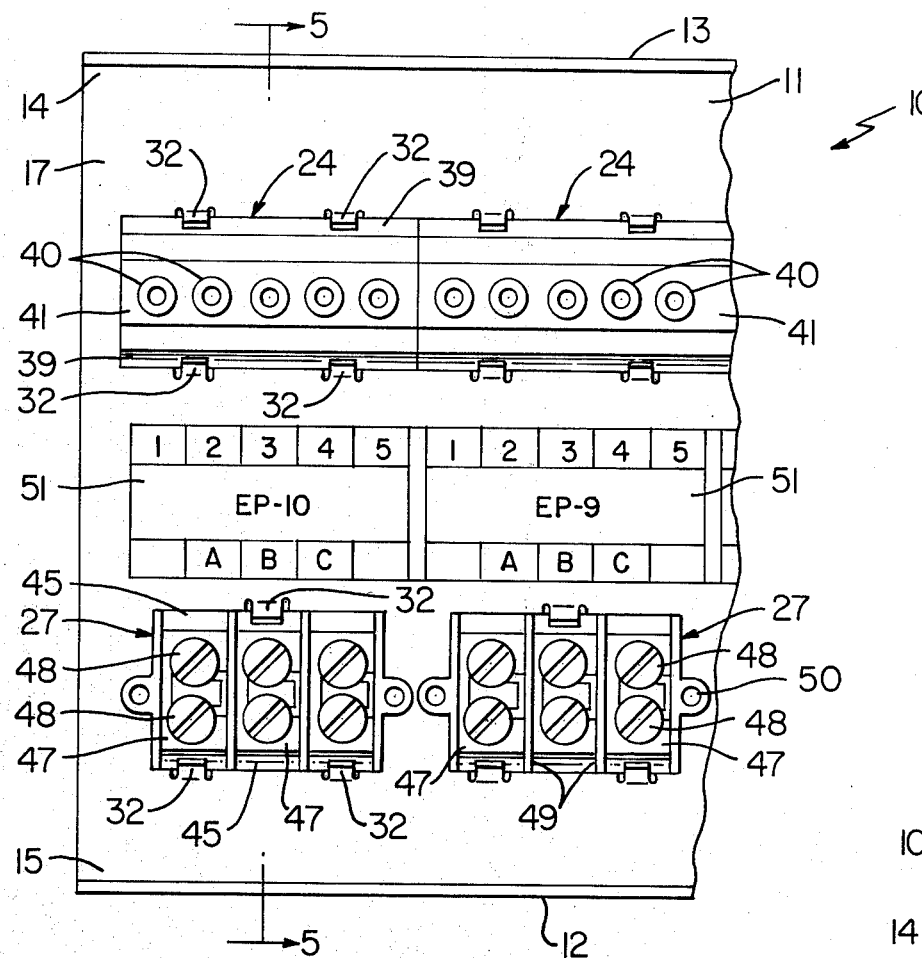
FIG. 4 is a fragmentary rear view of the manifold means of FIG. 1.

If desired, suitable labeling 51 can be placed on the side 17 of the frame means 11 in the manner illustrated in FIG. 4 to provide suitable keys to a service man or an assembler as to how to attach the external penumatic and electrical lines respectively to the pneumatic interconnection means 40 of the pneumatic means 24 and the interconnection means 47 of the electrical means 27.

Thus, it can be seen that it is a relatively simple method of this invention to form the manifold means 10 of this invention so that the desired number of pneumatic means 24 and electrical means 27 can be detachably carried by the frame means 11 and have the desired number of control units 18 and 19 plugged into the side 16 thereof to complete a manifold arrangement that comprises a combination of the manifold means 10 and the control units 18 and 19.

Should it be desired to utilize the frame means 11 of this invention to form a manifold means without having the pneumatic means 24 and electrical means 27 in combination therewith, the frame means 11 is readily adapted to detachably carry the control units 18 and 19 on the side 16 thereof and still provide interconnection thereto from external pneumatic and electrical lines all attached to the side 17 of the frame means 11.

Figure 7:
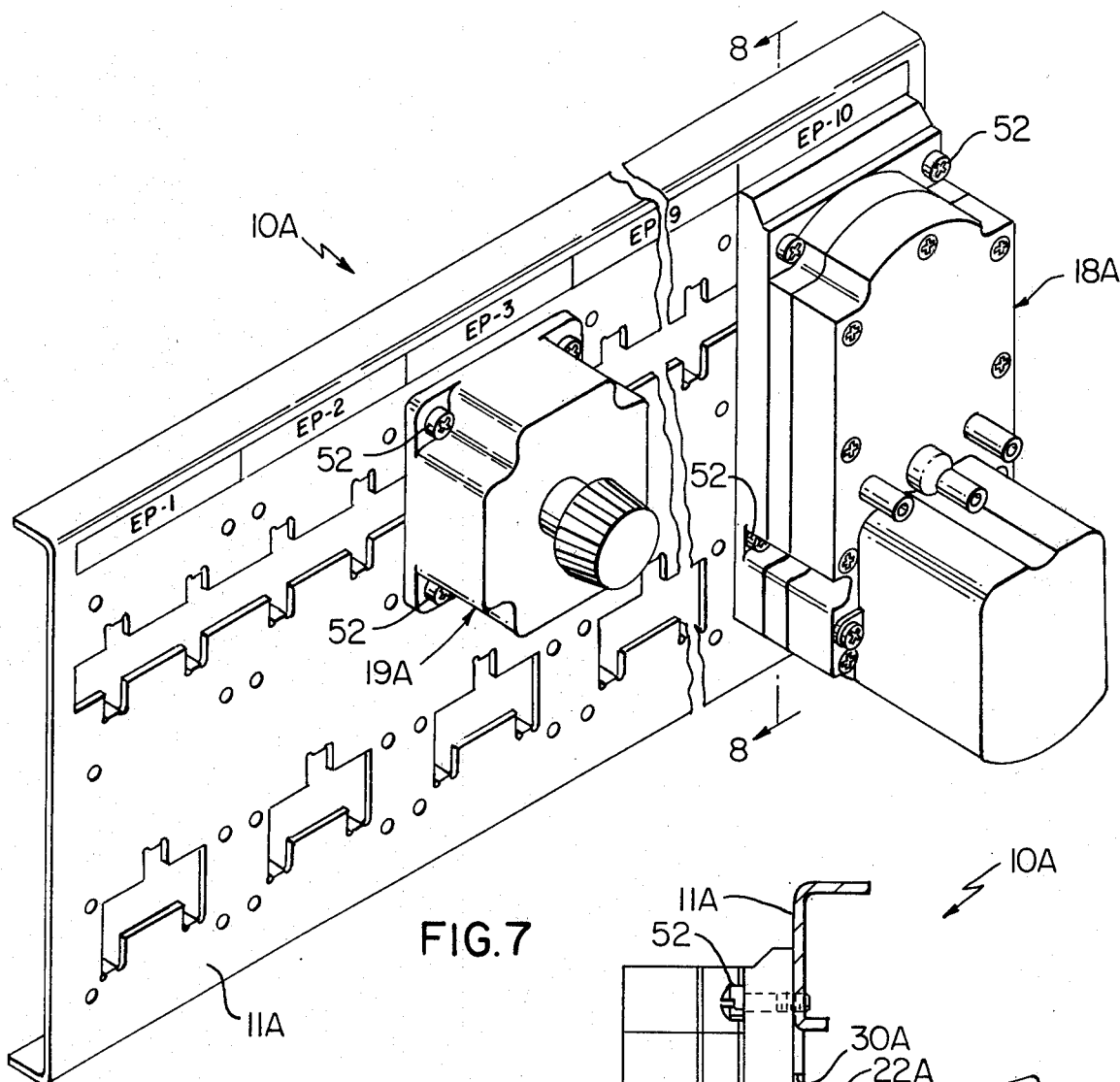
FIG. 7 is a perspective view similar to FIG. 1 and illustrates the frame means of the manifold means of FIG. 1 carrying the control units thereon without utilizing the pneumatic means and electrical means of FIGS. 2 and 3.
Figure 8:
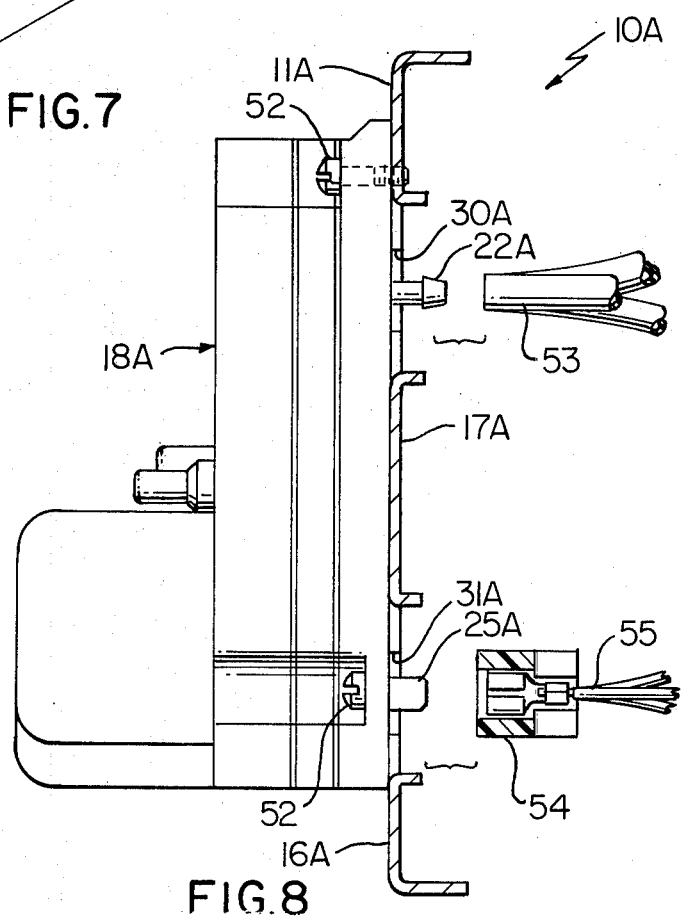
FIG. 8 is a cross-sectional view taken on line 8—8 of FIG. 7.

In particular, reference is now made to FIGS. 7 and 8 wherein another manifold means of this invention is generally indicated by the reference numeral 10A and parts thereof similar to the manifold means 10 previously described are indicated by like reference numerals followed by the reference letter "A".

As illustrated in FIGS. 7 and 8, the frame means 11A of the manifold means 10A is substantially identical to the frame means 11 previously described except that the same does not have any of the pneumatic means 24 and electrical means 27 carried thereby.

However, the control units 18A and 19A are fastened to the side 16A of the frame means 11A by fastening members 52 in such a manner that the nipple means 22A project through the opening means 30A and the electrical plug-in tongues 25A project through the opening means 31A.

In this manner, suitable flexible external pneumatic conduits 53 can be plugged directly onto the nipple means 22A of the control devices 18A and 19A at the side 17A of the frame means 11A.

Similarly, suitable female connector means 54 for external electrical lines 55 can be plugged directly onto the projecting tongues 25A of the control devices 18A at the side 17A of the frame means 11A.

Thus, while the control devices 18A and 19A are not plugged into and unplugged from the side 16A of the frame means 11A of the manifold means 10A with the ease of operation as the control devices 18 and 19 of FIG. 1, the resulting manifold means 10A can be formed to be substantially cheaper than the manifold means 10 previously described because the pneumatic means 24 and electrical means 27 are not utilized.

Accordingly, it can be seen that the frame means 11 and 11A of this invention can be utilized for various types of manifold means 10 and 10A so as to permit control devices to be interconnected to one side thereof and all of the external pneumatic and electrical lines to be interconnected to the other side thereof.

From the above, it can be seen that the manifold means 10 or 10A of this invention can be made up by the method of this invention on a table top wherein only a hammer and punch may be needed to lock the tabs 32 in place or by utilizing cheap metal screws to attach the control devices 18 or 19 or 18A and 19A to the frame means 11 and 11A, as desired.

The finished manifold means 10 or 10A is then mounted in a cabinet (not shown) and since connections are all behind the frame means 11 or 11A at the side 17 or 17A thereof, it would be convenient for the frame means 11 or 11A to pivot at one side thereof so that the manifold means 10 or 10A can be easily moved into position for access to both the front and back sides 16, 17 or 16A, 17A thereof.

Although not illustrated, it is to be understood that the manifold means 10 of this invention that comprises parts 11, 24 and 27 could be molded as a one-piece structure so that separate units 24 and 27 need not be secured thereto as the one-piece structure would still permit a plug-in of the control devices 18 and 19 and having the external pneumatic and electrical lines interconnected to the rear side 17 thereof.

From the above, it can be seen that this invention not only provides an improved manifold means and method of making the same, but also this invention provides an improved frame means for such a manifold means and a method of making such a frame means.

While the forms and methods of this invention now preferred have been illustrated and described as required by the Patent Statute, it is to be understood that other forms and method steps can be utilized and still fall within the scope of the appended claims.

What is claimed is:

1. In a manifold means adapted to detachably carry on one side thereof a plurality of pneumatically and electrically operated control units each of which is adapted to be fluidly and electrically interconnected to pneumatic means and electrical means of said manifold means by plug-in means of said units respectively cooperating with plug-in means of said pneumatic means and said electrical means of said manifold means at said one side thereof, the improvement wherein said manifold means has external interconnection means for said pneumatic means and said electrical means on the other side thereof whereby external pneumatic and electrical lines can all be interconnected to said other side of said manifold means.

2. A manifold means as set forth in claim 1 wherein said pneumatic means are detachably carried by said manifold means.

3. A manifold means as set forth in claim 1 wherein sid electrical means are detachably carried by said manifold means.

4. A manifold means as set forth in claim 1 wherein said pneumatic means and said electrical means are detachably carried by said manifold means.

5. A manifold means as set forth in claim 4 wherein said manifold means includes a frame means having opposied sides that respectively define said one side and said other side of said manifold means, said frame means having a plurality of opening means passing therethrough and respectively receiving said pneumatic means and said electrical means therein.

6. A manifold means as set forth in claim 5 wherein each pneumatic means and electrical means has a front surface means thereof that is disposed substantially flush with said side of said frame means that defines said one side of said manifold means.

7. A manifold means as set forth in claim 6 wherein each said pneumatic means and electrical means has said front surface means thereof interrupted by a plurality of openings that define part of said plug-in means of said manifold means.

8. A manifold means as set forth in claim 5 wherein said frame means has tab means detachably holding said pneumatic means and said electrical means in their respective opening means of said frame means.

9. A manifold means as set forth in claim 8 wherein said frame means comprises a plate means and said tab means comprise a plurality of tabs respectively carved from said plate means so as to be integrally hinged thereto.

10. A manifold means as set forth in claim 5 wherein said frame means has opposed ends, said opening means for said pneumatic means being disposed in aligned relation adjacent one of said ends of said frame means, said opening means for said electrical means being disposed in aligned relation adjacent the other of said ends of said frame means.

11. A manifold means as set forth in claim 5 wherein each pneumatic means comprises a block-like member having plug-in means for one of said control units.

12. A manifold means as set forth in claim 5 wherein each electrical means comprises a block-like member having plug-in means for one of said control units.

13. In a method of making a manifold means adapted to detachably carry on one side thereof a plurality of pneumatically and electrically operated control units each of which is adapted to be fluidly and electrically interconnected to pneumatic means and electrical means of said manifold means by plug-in means of said units respectively cooperating with plug-in means of said pneumatic means and said electrical means of said manifold means at said one side thereof, the improvement comprising the step of forming said manifold means with external interconnection means for said pneumatic means and said electrical means on the other side thereof whereby external pneumatic and electrical lines can all be interconnected to said other side of said manifold means.

14. A method of making a manifold means as set forth in claim 13 and including the step of detachably securing said pneumatic means to said manifold means.

15. A method of making a manifold means as set forth in claim 13 and including the step of detachably securing said electrical means to said manifold means.

16. A method of making a manifold means as set forth in claim 13 and including the step of detachably securing said pneumatic means and said electrical means to said manifold means.

17. A method of making a manifold means as set forth in claim 16 and including the method steps of forming said manifold means to include a frame means having opposed sides that respectively define said one side and said other side of said manifold means, forming said frame means with a plurality of opening means passing therethrough, and detachably securing said pneumatic means and said electrical means in said opening means.

18. A method of making a manifold means as set forth in claim 17 and including the step of forming each pneumatic means and electrical means with a front surface means thereof that is disposed substantially flush with said side of said frame means that defines said one side of said manifold means.

19. A method of making a manifold means as set forth in claim 18 and including the step of forming each said pneumatic means and electrical means so that said front surface means thereof is interrupted by a plurality of openings that define part of said plug-in means of said manifold means.

20. A method of making a manifold means as set forth in claim 17 and including the step of forming said frame means with tab means that detachably hold said pneumatic means and said electrical means in their respective opening means of said frame means.

21. A method of making a manifold means as set forth in claim 20 and including the steps of forming said frame means from a plate means, and forming said tab means by carving a plurality of tabs from said plate means so as to be integrally hinged thereto.

22. A method of making a manifold means as set forth in claim 17 and including the steps of forming said opening means for said pneumatic means to be disposed in aligned relation adjacent one opposed end of said frame means, and forming said opening means for said electrical means to be disposed in aligned relation adjacent the other opposed end of said frame means.

23. A method of making a manifold means as set forth in claim 17 and including the step of forming each pneumatic means to comprise a block-like member having plug-in means for one of said control units.

24. A method of making a manifold means as set forth in claim 17 and including the step of forming each electrical means to comprise a block-like member having plug-in means for one of said control units.

25. In a combination of a manifold means detachably carrying on one side thereof a plurality of pneumatically and electrically operated control units each of which is fluidly and electrically interconnected to pneumatic means and electrical means of said manifold means by plug-in means of said units respectively cooperating with plug-in means of said pneumatic means and said electrical means of said manifold means at said one side thereof, the improvement wherein said manifold means has external interconnection means for said pneumatic means and said electrical means on the other side thereof whereby external pneumatic and electrical lines can all be interconnected to said other side of said manifold means.

26. A combination as set forth in claim 25 wherein said pneumatic means are detachably carried by said manifold means.

27. A combination as set forth in claim 25 wherein said electrical means are detachably carried by said manifold means.

28. A combination as set forth in claim 25 wherein said pneumatic means and said electrical means are detachably carried by said manifold means.

29. A combination as set forth in claim 28 wherein said manifold means includes a frame means having opposed sides that respectively define said one side and said other side of said manifold means, said frame means having a plurality of opening means passing therethrough and respectively receiving said pneumatic means and said electrical means therein.

30. A combination as set forth in claim 29 wherein each pneumatic means and electrical means has a front surface means thereof that is disposed substantially flush with said side of said frame means that defines said one side of said manifold means.

31. A combination as set forth in claim 30 wherein each said pneumatic means and electrical means has said front surface means thereof interrupted by a plurality of openings that define part of said plug-in means of said manifold means.

32. A combination as set forth in claim 29 wherein said frame means has tab means detachably holding said pneumatic means and said electrical means in their respective opening means of said frame means.

33. A combination as set forth in claim 32 wherein said frame means comprises a plate means and said tab means comprise a plurality of tabs respectively carved from said plate means so as to be integrally hinged thereto.

34. A combination as set forth in claim 29 wherein said frame means has opposed ends, said opening means for said pneumatic means being disposed in aligned relation adjacent one of said ends of said frame means, said opening means for said electrical means being disposed in aligned relation adjacent the other of said ends of said frame means.

35. A combination as set forth in claim 29 wherein each pneumatic means comprises a block-like member having plug-in means for one of said control units.

36. A combination as set forth in claim 29 wherein each electrical means comprises a block-like member having plug-in means for one of said control units.

37. In a frame means for a manifold means adapted to detachably carry on one side thereof a plurality of pneumatically and electrically operated control units each of which is adapted to be fluidly and electrically interconnected to pneumatic means and electrical means of said manifold means by plug-in means of said units respectively cooperating with plug-in means of said pneumatic means and said electrical means of said manifold means of said one side thereof, the improvement wherein frame means has means adapted to detachably carry said pneumatic means and said electrical means so that external interconnection means for said pneumatic means and said electrical means will be disposed on the other side of said manifold means whereby external pneumatic and electrical lines can all be interconnected to said other side of said manifold means.

38. A frame means as set forth in claim 37 wherein said frame means has opposed sides that respectively define said one side and said other side of said manifold means, said frame means having a plurality of opening means passing therethrough for respectively receiving said pneumatic means and said electrical means therein.

39. A frame means as set forth in claim 38 wherein said frame means has tab means for detachably holding said pneumatic means and said electrical means in their respective opening means of said frame means.

40. A frame means as set forth in claim 39 wherein said frame means comprises a plate means and said tab means comprise a plurality of tabs respectively carved from said plate means so as to be integrally hinged thereto.

41. A frame means as set forth in claim 38 wherein said frame means has opposed ends, said opening means for said pneumatic means being disposed in aligned relation adjacent one of said ends of said frame means, said opening means for said electrical means being disposed in aligned relation adjacent the other of said ends of said frame means.

42. In a method of making a frame means for a manifold means adapted to detachably carry on one side thereof a plurality of pneumatically and electrically operated control units each of which is adapted to be fluidly and electrically interconnected to pneumatic means and electrical means of said manifold means by plug-in means of said units respectively cooperating with plug-in means of said pneumatic means and said electrical means of said manifold means at said one side thereof, the improvement comprising the step of forming said frame means with means adapted to detachably carry said pneumatic means and said electrical means so that external interconnection means for said pneumatic means and said electrical means will be disposed on the other side of said manifold means whereby external pneumatic and electrical lines can all be interconnected to said other side of said manifold means.

43. A method of making a frame means as set forth in claim 42 and including the steps of forming said frame means with opposed sides that respectively define said one side and said other side of said manifold means, and forming said frame means with a plurality of opening means passing therethrough for respectively receiving said pneumatic means and said electrical means therein.

44. A method of making a frame means as set forth in claim 43 and including the step of forming said frame means with tab means for detachably holding said pneumatic means and said electrical means in their respective opening means of said frame means.

45. A method of making a frame means as set forth in claim 44 and including the steps of forming said frame means from a plate means, and forming said tab means to comprise a plurality of tabs respectively carved from said plate means so as to be integrally hinged thereto.

46. A method of making a frame means as set forth in claim 42 and including the steps of forming said frame means to have opposed ends, forming said opening means for said pneumatic means to be disposed in aligned relation adjacent one of said ends of said frame means, and forming said opening means for said electrical means to be disposed in aligned relation adjacent the other of said ends of said frame means.

* * * * *